US009834679B2

(12) United States Patent
Srikanth et al.

(10) Patent No.: US 9,834,679 B2
(45) Date of Patent: Dec. 5, 2017

(54) THERMALLY STABLE, HIGH REFRACTIVE INDEX CURABLE SILICONE COMPOSITIONS

(71) Applicants: Abirami Srikanth, Bangalore (IN); Douglas M. Dukes, Troy, NY (US)

(72) Inventors: Abirami Srikanth, Bangalore (IN); Douglas M. Dukes, Troy, NY (US)

(73) Assignee: MOMENTIVE PERFORMANCE MATERIALS INC., Waterford, NY (US)

(*) Notice: Subject to any disclaimer, the term of this patent is extended or adjusted under 35 U.S.C. 154(b) by 4 days.

(21) Appl. No.: 14/814,965

(22) Filed: Jul. 31, 2015

(65) Prior Publication Data
US 2016/0032102 A1 Feb. 4, 2016

Related U.S. Application Data

(60) Provisional application No. 62/032,091, filed on Aug. 1, 2014.

(51) Int. Cl.
C08L 83/08 (2006.01)
C08L 83/04 (2006.01)
C08K 5/00 (2006.01)
C08G 77/20 (2006.01)
C08G 77/28 (2006.01)

(52) U.S. Cl.
CPC ............. C08L 83/08 (2013.01); C08G 77/20 (2013.01); C08G 77/28 (2013.01)

(58) Field of Classification Search
CPC ......... C08G 77/28; C08L 83/04; C08L 83/08; C08K 5/13; C08K 5/53; C08K 5/005
See application file for complete search history.

(56) References Cited

U.S. PATENT DOCUMENTS

| 4,052,529 | A |   | 10/1977 | Bokerman et al. |            |
|-----------|---|---|---------|-----------------|------------|
| 4,107,390 | A |   | 8/1978  | Gordon et al.   |            |
| 4,707,503 | A | * | 11/1987 | Itoh ............. | C08K 5/5406 |
|           |   |   |         |                 | 522/99     |
| 4,935,455 | A | * | 6/1990  | Huy ............. | C03C 25/106 |
|           |   |   |         |                 | 522/83     |
| 4,946,874 | A |   | 8/1990  | Lee et al.      |            |
| 5,100,993 | A | * | 3/1992  | Hida ........... | C08K 5/5406 |
|           |   |   |         |                 | 522/172    |
| 5,169,879 | A | * | 12/1992 | Lee ............. | C03C 25/106 |
|           |   |   |         |                 | 522/14     |
| 5,302,627 | A | * | 4/1994  | Field .......... | C08F 2/46  |
|           |   |   |         |                 | 522/13     |

(Continued)

Primary Examiner — Sanza McClendon
(74) Attorney, Agent, or Firm — Joseph Waters; McDonald Hopkins LLC

(57) ABSTRACT

A curable composition comprises (a) a mercapto-functional siloxane; (b) a siloxane comprising unsaturated functional groups; (c) a photoinitiator; and (d) an antioxidant compound. In one embodiment, the antioxidant is chosen from a hindered phenolic compound. The curable compositions can be utilized to form a cured article, which may be useful in a variety of applications including, but not limited to, optical applications. The cured articles from the cured compositions may exhibit good physical properties including, for example, high refractive index. The articles may also exhibit good thermal stability.

19 Claims, 2 Drawing Sheets

(56) References Cited

U.S. PATENT DOCUMENTS

| | | | | |
|---|---|---|---|---|
| 5,420,222 | A * | 5/1995 | Stepp | C08L 83/04 522/35 |
| 6,187,835 | B1 * | 2/2001 | Szum | C03C 25/106 428/30 |
| 8,293,810 | B2 * | 10/2012 | Ito | C08F 283/12 522/148 |
| 8,716,362 | B2 * | 5/2014 | Ono | C08L 83/08 520/1 |
| 8,865,787 | B2 * | 10/2014 | Sakamoto | C08K 5/548 156/272.2 |
| 9,340,711 | B2 * | 5/2016 | Ono | C08K 5/5425 |
| 9,353,265 | B2 * | 5/2016 | Ono | C08L 83/08 |
| 2004/0198924 | A1 | 10/2004 | Young et al. | |
| 2013/0042973 | A1 | 2/2013 | Sakamoto | |

* cited by examiner

THERMALLY STABLE, HIGH REFRACTIVE INDEX CURABLE SILICONE COMPOSITIONS

CROSS-REFERENCE TO RELATED APPLICATIONS

This application claims priority to and the benefit of U.S. Provisional Patent Application No. 62/032,091 titled "Thermally Stable, High Refractive Index Curable Silicone Compositions," filed on Aug. 1, 2014, the entire disclosure of which is incorporated herein by reference in its entirety.

FIELD

The present technology provides curable compositions. In particular, the present technology provides curable compositions for producing cured materials and articles having a high refractive index and/or good physical properties. The curable compositions comprise a mercapto-functional siloxane; a siloxane comprising an unsaturated functional group; a photoinitiator; and a hindered phenol.

BACKGROUND

Siloxane polymers or copolymers having a high refractive index have been increasingly used for a variety of optical applications including, for example, in contact lenses, intraocular lenses, etc. Such polymers are also finding their way into other optical applications requiring high transmission and high refractive index including but not limited to, solid state lighting (light emitting diodes, organic light emitting diodes, laser diodes), waveguides (both planar and "fiber" geometries), optical computing, optical storage media, antireflection coatings, conformal coatings, optical lenses, micro lenses, automobile topcoats, paint formulations, hair care products, gradient refractive index optical components, dynamic gradient refractive index components, etc.

Depending on the application, the polymers and products formed from such polymers may need to exhibit a wide range of properties including sufficient structural integrity, strength, elasticity and elongation, thermal stability and index of refraction. In some applications, the polymers must exhibit these properties when formed into a thin film. For example, in intraocular lenses, the lens must be thin and pliable for insertion through a small incision in intraocular lens applications, be able to regain its original shape after incision, and have sufficient structural integrity and strength to retain such shape under normal use conditions.

Typical optical grade methyl siloxanes have excellent optical transmission, but intrinsically low refractive index (1.41) and poor barrier properties against moisture and gas. The development of higher refractive index siloxanes with improved barrier properties has revolved around the use of cyclohexyl, cyclopentyl, and phenyl groups to increase the refractive index beyond 1.40. Examples of typical optical grade siloxanes include a copolymer of cyclohexylmethyl-dimethyl siloxanes, cyclopentylmethyl-dimethyl siloxanes, diphenyl-dimethyl siloxanes, or methylphenyl-dimethyl siloxanes.

Aromatic groups are traditionally introduced into the siloxane polymers and conventional co-polymers to increase the refractive index of the materials. Most often these groups consist of dimethylsiloxane-phenylmethylsiloxane co-polymers or dimethylsiloxane-diphenylsiloxane co-polymers. At a phenyl content of approximately 15 mole %, a polydimethyl siloxane/methylphenyl siloxane co-polymer has a refractive index of 1.462.

The introduction of refractive index modifying groups, such as phenyl-groups, in polysiloxanes is known to result in several disadvantages. Materials formed from siloxanes containing phenyl groups can have reduced flexibility, poor mechanical strength and elasticity, and they may be hard and brittle. Further, materials with phenyl content greater than 40 wt % are not easily processed and tend to exhibit poor mechanical strength. This limits the refractive index that can be achieved to about 1.54. In addition, phenyl group containing polymers are known to be unstable in ultraviolet light.

The incorporation of phenyl into the silicones makes the resulting polymer more vulnerable under thermal and UV exposure conditions. This result in yellowing of the optical material and transmission losses such that the transmission level is below a tolerable level and can lead to mechanical failure of a device in the optical components. There is a need for high refractive index siloxanes that have good physical properties and are thermally stable.

SUMMARY

The present technology provides curable compositions for producing cured materials suitable for a variety of applications including, but not limited to, optical applications. The curable compositions provide cured materials that exhibit good physical properties such as, for example, transparency, high refractive index, and/or thermal stability.

In one aspect, the use of the mercapto-functional siloxane provides a material with a relatively high refractive index. Additionally, by selecting an appropriate photoinitiator and a hindered phenolic compound, a siloxane can be provided that has high refractive index and physical properties such as thermal stability.

The present technology also provides a dual cure system that can be cured by multiple techniques. In one embodiment, the curable compositions can be cured by (1) UV radiation, and (2) thermal and/or condensation curing. The ability to provide multiple curing options allows for more controlled curing and to ensure that the cured material is cured through the bulk of the material.

In one aspect, the present technology provides a curable composition comprising: (a) a mercapto-functional siloxane comprising; (b) a siloxane comprising an unsaturated hydrocarbon group; (c) a photoinitiator; and (d) an antioxidant compound comprising a hindered phenol; wherein (a) and (b) are provided such that the composition has a molar equivalent ratio of mercapto groups to unsaturated groups of greater than 1:1.

In embodiments, the mercapto-function siloxane is a siloxane of the formula:

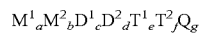  (1)

where the M-units are of the formula $R^1R^2R^3SiO_{1/2}$; the D-units are of the formula: $R^4R^5SiO_{2/2}$; the T-units have three Si—O bonds are of the formula: $R^6SiO_{3/2}$; the Q-units are of the formula $SiO_{4/2}$; $R^1$-$R^6$ are independently chosen from hydrogen, a hydroxyl, a linear or branched alkyl group, an alcohol, a linear or branched alkoxy group, an aryl group, an alkylvinyl group, an amide, an amino-group, an acryloyl group, a carbonyl group, a silyloxy group, an isocyanyl group, a mercapto group, an epoxy-containing group, where one or more of $R^1$-$R^6$ is a mercapto group; a is from 0-1000, b is from 0-1000; c is from 0-500; d is from 0-500; e is from 0-100; f is from 0-100; and g is from 0 to 200, where at least two subscripts on any particular embodiment are positive integers.

The present technology also provides a composition according to any of the previous embodiments, wherein the mercapto group is of the formula —$(CH_2)_h SH$, where h is 0-10.

The present technology also provides a composition according to any of the previous embodiments, wherein the mercapto group is chosen from mercaptomethyl, 2-mercaptoethyl, 3-mercaptopropyl, 4-mercaptobutyl, or a combination of two or more thereof.

The present technology also provides a composition according to any of the previous embodiments, wherein the siloxane (b) is of the formula:

$$M^3{}_i M^4{}_j D^3{}_k D^4{}_l T^3{}_m T^4{}_n Q_o \qquad (2)$$

where the M-units are of the formula $R^7 R^8 R^9 SiO_{1/2}$; the D-units are of the formula $R^{10} R^{11} SiO_{2/2}$; the T-units have three Si—O bonds are of the formula $R^{12} SiO_{3/2}$; the Q-units are of the formula $SiO_{4/2}$; $R^7$-$R^{12}$ are independently chosen from hydrogen, a hydroxyl, a linear or branched alkyl group, an alcohol, a linear or branched alkoxy group, an aryl group, an alkylvinyl group, an amide, an amino group, an acryloyl group, a carbonyl groups, a silyloxy group, an isocyanyl group, a mercapto group, an epoxy-containing group, where one or more of $R^7$-$R^{12}$ comprises an unsaturated group; i is from 0-1000, j is from 0-1000, k is from 0-500, l is from 0-100, m is from 0-100, n is from 0-100, and o is from 0 to 200, where at least two subscripts on any particular embodiment are positive integers.

The present technology also provides a composition according to any of the previous embodiments, wherein the unsaturated group comprises an alkenyl group of the formula $CH_2=CH-R^{13}{}_x-$ where $R^{13}$ is a C1-C20 alkyl, a C1-C20 branched alkyl, a C1-C10 cyclic alkyl, or a C6-C10 aryl group.

The present technology also provides a composition according to any of the previous embodiments, wherein the unsaturated group is chosen from vinyl, allyl, styryl, butenyl, pentenyl, hexenyl, or a combination of two or more thereof.

The present technology also provides a composition according to any of the previous embodiments, wherein the photoinitiator is an acylphosphine compound.

The present technology also provides a composition according to any of the previous embodiments, wherein the acylphosphine compound is chosen from a mono-acylphosphine compound, a bis-acylphosphine compound, or a combination of two or more thereof.

The present technology also provides a composition according to any of the previous embodiments, wherein the acylphosphine compound is chosen from diphenyl(2,4,6-trimethylbenzoyl)phosphine oxide and bis(2,6-di-methoxybenzoyl)-2,4,4-trimethylpentylphosphine oxide.

The present technology also provides a composition according to any of the previous embodiments, wherein the hindered phenol is chosen from 2,6-di-t-butyl-p-cresol; 2-t-butyl-4-methoxyphenol; 3-t-butyl-4-methoxyphenol; 2,6-t-butyl-4-ethylphenol; 2,2'-methylene-bis(4-methyl-6-t-butylphenol); 4,4'-thiobis(3-methyl-6-t-butylphenol); 4,4'-butylidene-bis(3-methyl-6-t-butylphenol); 1,1,3-tris(2-methyl-4-hydroxy-5-t-butylphenyl)butane; 1,3,5-trimethyl-2,4,6-tris(3,5-di-t-butyl-4-hydroxybenzyl)benzene; tetrakis[methylene-3-(3',5'-di-t-butyl-4'-hydroxyphenyl) propionate]methane; bis[3,3'-bis(4'-hydroxy-3-t-butylphenyl)butyric acid glycol ester; tocopherol; or a combination of two or more thereof.

The present technology also provides a composition according to any of the previous embodiments, wherein the molar equivalent ratio of mercapto-groups to unsaturated hydrocarbon groups is from about 2.5:1 to about 6:1.

The present technology also provides a composition according to any of the previous embodiments, wherein the photoinitiator is present in an amount of from about 200 ppm to about 1500 ppm.

The present technology also provides a composition according to any of the previous embodiments, wherein the hindered phenol is present in an amount of from about 200 ppm to about 2000 ppm.

In another aspect, the present technology provides a cured article formed from a curable composition comprising according to any of the previous embodiments.

In one embodiment, the cured article has a refractive index of from about 1.41 to about 1.53.

The present technology also provides an article according to any of the previous embodiments, wherein the cured article has a yellowing index of from about 0 to about 10 after ageing for 350 hours.

The present technology also provides an article according to any of the previous embodiments, wherein the article has a transparency of about 85% or greater.

In another aspect, the present technology also provides, a method of forming a cured article comprising exposing a curable composition according to any of the previous embodiments to UV light, visible light, or a combination of two or more thereof.

In one embodiment, the method comprises heating the curable composition by exposing the composition to a temperature of from about 70° C. to about 150° C.

These and other aspects of the technology are further understood with reference to the following detailed description.

DETAILED DESCRIPTION

Figure 1:
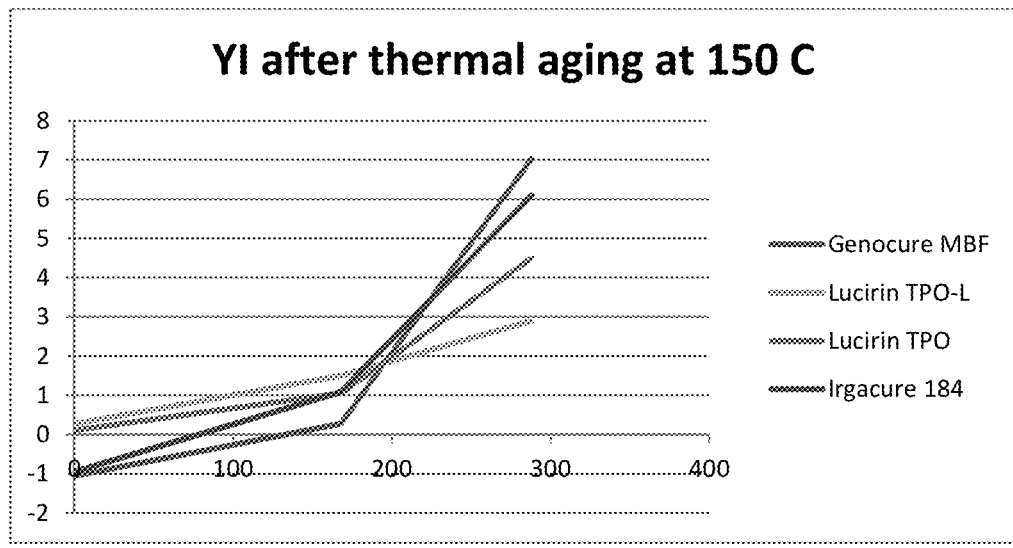
FIG. 1 is a graph showing the yellowing index of cured articles in accordance with embodiments of the present technology.

The present technology provides a curable silicone composition. The silicone composition comprises mercapto groups that introduce a sulfur atom into the final cured material through the formation of a thioether. The incorporation of sulfur atoms from the mercapto into the cured material provides a thioether-containing material with a relatively high refractive index compared to standard polydimethyl siloxanes. The curable compositions comprise (a) a mercapto-functional siloxane; (b) a siloxane comprising unsaturated functional groups; (c) a photoinitiator; and (d) a hindered phenolic compound. The combination of these materials provide a cured material that is high in refractive index and/or exhibits good physical properties such as, for example, thermal stability.

As used herein, the term "alkyl" includes straight, branched and cyclic alkyl groups. Specific and non-limiting examples of alkyls include, but are not limited to, methyl, ethyl, propyl, isobutyl, and cyclohexyl.

As used herein, the term "substituted alkyl" includes an alkyl group that contains one or more substituent groups that are inert under the process conditions to which the compound containing these groups is subjected. The substituent groups also do not substantially or deleteriously interfere with the process.

As used herein, the term "aryl" refers to a non-limiting group of any aromatic hydrocarbon from which one hydrogen atom has been removed. An aryl may have one or more aromatic rings, which may be fused, connected by single bonds or other groups. Examples of suitable aryls include, but are not limited to, tolyl, xylyl, phenyl and naphthalenyl.

As used herein, the term "substituted aryl" refers to an aromatic group substituted as set forth in the above definition of "substituted alkyl." Similar to an aryl, a substituted aryl may have one or more aromatic rings, which may be fused, connected by single bonds or other groups; however, when the substituted aryl has a heteroaromatic ring, the attachment can be through a heteroatom (such as nitrogen) of the heteroaromatic ring instead of a carbon. In one embodiment, the substituted aryl groups herein contain 1 to about 30 carbon atoms.

As used herein, the term "alkenyl" refers to any straight, branched, or cyclic alkenyl group containing one or more carbon-carbon double bonds, where the point of substitution can be either a carbon-carbon double bond or elsewhere in the group. Examples of suitable alkenyls include, but are not limited to, vinyl, propenyl, allyl, methallyl, ethylidenyl norbornyl, etc.

As used herein, the term "alkynyl" refers to any straight, branched, or cyclic alkynyl group containing one or more carbon-carbon triple bonds, where the point of substitution can be either at a carbon-carbon triple bond or elsewhere in the group.

As used herein, the term "unsaturated" refers to one or more double or triple bonds. In one embodiment, it refers to carbon-carbon double or triple bonds.

As used herein, the term "inert substituent" refers to a group other than hydrocarbyl or substituted hydrocarbyl, which is inert under the process conditions to which the compound containing the group is subjected. The inert substituents also do not substantially or deleteriously interfere with any process described herein that the compound in which they are present may take part in. Examples of inert substituents include, but are not limited to, halo (fluoro, chloro, bromo, and iodo), and ether such as —OR wherein R is hydrocarbyl or substituted hydrocarbyl.

As used herein, the term "hetero atoms" refers to any of the Group 13-17 elements except carbon, and can include, for example, oxygen, nitrogen, silicon, sulfur, phosphorus, fluorine, chlorine, bromine, and iodine.

As used herein, the term "olefin" refers to any aliphatic or aromatic hydrocarbon also containing one or more aliphatic carbon-carbon unsaturations. Such olefins may be linear, branched, or cyclic and may be substituted with heteroatoms as described above, with the proviso that the substituents do not interfere substantially or deleteriously with the course of the desired reaction to produce the dehydrogenatively silylated or hydrosilylated product.

Mercapto-Functional Siloxane

The curable composition comprises a mercapto-functional siloxane. The siloxane can be represented by the Formula (1):

$$M^1_a M^2_b D^1_c D^2_d T^1_e T^2_f Q_g \qquad (1)$$

where M, D, T, and Q have their usual meaning in siloxane nomenclature, and the subscripts a, b, c, d, e, f, and g are such that the molar mass of the siloxane-type reactant is between 100 and 100,000 Dalton. M-units have one Si—O bond and thus can be described by the formula: $R^1 R^2 R^3 SiO_{1/2}$, where $R^1$, $R^2$, $R^3$ are independently selected organic groups bonded to the silicon atom through a C—Si bond. D-units have two Si—O bonds, and thus can be described by the formula: $R^4 R^5 SiO_{2/2}$, again, where $R^4$ and $R^5$ are independently selected organic groups bonded to the silicon atom through a C—Si bond. T-units have three Si—O bonds, and thus can be described by the formula: $R^6 SiO_{3/2}$, where $R^6$ is a selected organic group bonded to the silicon atom through a C—Si bond. Finally, Q-units have four Si—O bonds, and can be described by the formula: $SiO_{4/2}$. In the mercapto-functional siloxane, at least one of the $R^1$-$R^6$ groups comprises a mercapto group.

The mercapto group comprises a —SH group. In one embodiment, the mercapto group is of the formula —(CH$_2$)$_h$SH, where h is 0-10. Examples of suitable mercapto groups include, but are not limited to, mercaptomethyl, 2-mercaptoethyl, 3-mercaptopropyl, 4-mercaptobutyl, etc.

The remaining $R^1$-$R^6$ groups can be selected as desired for a particular purpose or intended application. In one embodiment, $R^1$-$R^6$ are independently chosen from hydrogen, hydroxyl, a linear or branched alkyl group, an alcohol, a linear or branched alkoxy group, an aryl group, an alkylvinyl group, amide, amino-groups, acryloyl groups, carbonyl groups, silyloxy (e.g., alkoxy silane) groups, isocyanyl groups, a mercapto group, epoxy-containing (e.g., glycidyl) groups, where one or more of $R^1$-$R^6$ (irrespective of M, D, T, and Q units) comprises a mercapto group. In one embodiment, a is from 0-1000, b is from 0-1000, c is from 0-500, d is from 0-500, e is from 0-100, f is from 0-100, and g is from 0 to 200, where at least two subscripts on any particular embodiment are positive integers. In one embodiment, the alkyl groups can be chosen from a linear, branched, and/or cyclic C1-C20 alkyl, a C6-C10 aryl, or combinations of two or more thereof. In one embodiment, the mercapto-functional siloxane comprises C1-C6 alkyl groups.

In one embodiment, the mercapto-functional siloxane comprises at least one unit with a mercapto group, and the remaining units comprising hyrdrocarbon groups such as linear or branched alkyl groups. In one embodiment, the mercapto-functional siloxane is a MDM type siloxane of the formula:

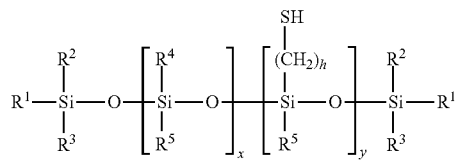

where $R^1$-$R^5$ are independently a C1-C10 alkyl group, x is 0 to 300, y is 1 to 100, and h is 1-10. In one embodiment, each of $R^1$-$R^5$ is an alkyl group, x is 0, y is about 40, and h is 3.

Examples of suitable mercapto-functional siloxanes include, but are not limited to, products such as KF-2001 and KF-2004 by Shin-Etsu Chemical Co., Ltd., SMS-022, SMS-042 and SMS-992 by Gelest Inc.; PS848, PS849, PS849.5, PS850, PS850.5 and PS927 by United Chemical Corp.; and B 7610 available from Momentive Performance Materials Inc.

Unsaturated Hydrocarbon-Functional Siloxane

The curable composition includes a siloxane comprising an unsaturated functional group. The siloxane can be of the formula (2):

$$M^3_i M^4_j D^3_k D^4_l T^3_m T^4_n Q_o \qquad (2)$$

where M, D, T, and Q have their usual meaning in siloxane nomenclature, and the subscripts i, j, k, l, m, n, and o are such that the molar mass of the siloxane-type reactant is between 100 and 100,000 Dalton. The M-units have one Si—O bond and thus can be described by the formula: $R^7 R^8 R^9 SiO_{1/2}$, where $R^7$, $R^8$, $R^9$ are independently selected organic groups bonded to the silicon atom through a C—Si bond. The D-units have two Si—O bonds, and thus can be described by the formula: $R^{10} R^{11} SiO_{2/2}$, again, where $R^{10}$ and $R^{11}$ are independently selected organic groups bonded to the silicon atom through a C—Si bond. T-units have three Si—O bonds, and thus can be described by the formula: $R^{12} SiO_{3/2}$, where $R^{12}$ is a selected organic group bonded to the silicon atom through a C—Si bond. Finally, the Q-units have four Si—O bonds, and can be described by the formula: $SiO_{4/2}$. In the siloxane comprising the unsaturated group, one or more of the $R^7$-$R^{12}$ groups comprises an unsaturated group.

The unsaturated group comprises at least one carbon-carbon double bond or a carbon-carbon triple bond. In one embodiment, the unsaturated group is an alkenyl group. The alkenyl group can be of the formula $CH_2=CH-R^{13}_x-$ where $R^{13}$ is a C1-C20 alkyl, a C1-C20 branched alkyl, a C1-C10 cyclic alkyl, or a C6-C10 aryl group. In one embodiment, the unsaturated group can be chosen from, but is not limited to, vinyl, allyl, styryl, butenyl, pentenyl, hexenyl, etc.

The remaining $R^7$-$R^{12}$ groups can be independently chosen from hydrogen, hydroxyl, a linear or branched alkyl group, an alcohol, a linear or branched alkoxy group, an aryl group, an alkylvinyl group, amide, amino-groups, acryloyl groups, carbonyl groups, silyloxy (e.g., alkoxy silane) groups, isocyanyl groups, mercapto groups (e.g., mercaptopropyl), epoxy-containing (e.g., glycidyl) groups, etc. In Formula 2, i is from 0-1000, j is from 0-1000, k is from 0-500, l is from 0-500, m is from 0-100, n is from 0-100, and o is from 0 to 200, where at least two subscripts on any particular embodiment are positive integers.

Examples of suitable siloxanes for the siloxane comprising the unsaturated group include, but are not limited to, vinyl-terminated polydimethylsiloxane(dimethylvinylsilyl-terminated polydimethylsiloxane), vinyl-terminated dimethylsiloxane-diphenylsiloxane copolymer, vinyl-terminated poly(methyl)(phenyl)siloxane, vinyl-terminated dimethylsiloxane-diethylsiloxane copolymer, trimethylsiloxy-terminated dimethylsiloxane-methyl(vinyl)siloxane copolymer, vinyl-terminated dimethylsiloxane-methyl(vinyl)siloxane copolymer, and trimethylsiloxy-terminated poly(methyl)(vinyl)siloxane. The siloxane comprising the unsaturated group can also be a cyclic siloxane. In one embodiment, the siloxane is a $D_4$ siloxane comprising one or more unsaturated groups. A non-limiting example of a suitable siloxane for the siloxane with the unsaturated group is a tetravinyl tetramethyl cyclic tetrasiloxane ($D_4^{vi}$).

Photoinitiator

The curable composition includes a photoinitiator to promote curing of the siloxanes. The photoinitiator can be chosen as desired for a particular purpose or intended application. Examples of suitable photoinitiators include, benzophenones, phosphine oxides, nitroso compounds, acryl halides, hydrazones, mercapto compounds, pyrillium compounds, triacrylimidazoles, benzimidazoles, chloroalkyl triazines, benzoin ethers, benzyl ketals, thioxanthones, camphorquinone, and acetophenone derivatives.

In one embodiment, the photoinitiator is chosen from an acylphosphine. The acyl phosphine can be a mono- or bis-acylphoshine. Examples of suitable acylphosphine oxides include those described in U.S. Pat. No. 6,803,392, which is incorporated herein by reference.

Specific examples of suitable acylphosphine photoinitiators include, but are not limited to, diphenyl(2,4,6-trimethylbenzoyl)phosphine oxide (DAROCUR® TPO), diphenyl (2,4,6-trimethylbenzoyl)phosphine oxide (ESACURE® TPO, LAMBERTI Chemical Specialties, Gallarate, Italy), diphenyl(2,4,6-trimethylbenzoyl)phosphine oxide (FIRST-CURE® HMPP available from Albemarle Corporation, Baton Rouge, La.), diphenyl(2,4,6-trimethylbenzoyi)phosphine oxide (LUCIRIN® TPO, available from BASF (Ludwigshafen, Germany), diphenyl(2,4,6-trimethylbenzoyl) phosphinate (LUCIRIN® TPO-L), phenyl bis(2,4,6-trimethyl benzoyl)phosphine oxide (IRGACURE® 819, available from Ciba Specialty Chemicals, Tarrytown, N.Y.), and bis(2,6-di-methoxybenzoyl)-2,4,4-trimethylpentylphosphine oxide (as IRGACURE® 1700, IRGACURE® 1800 and IRGACURE® 1850 in admixture with a-hydroxyketones from Ciba Spezialitätenchemie).

Examples of α-hydroxyketone photoinitiators can include 1-hydroxy-cyclohexylphenyl ketone (IRGACURE® 184), 2-hydroxy-2-methyl-1-phenyl-1-propanone (DAROCUR® 1173), and 2-hydroxy-1-[4-(2-hydroxyethoxy)phenyl]-2-methyl-1-propanone (IRGACURE® 2959), all available from Ciba Specialty Chemicals (Tarrytown, N.Y.).

Examples of α-aminoketones photoinitiators can include 2-benzyl-2-(dimethylamino)-1-[4-(4-morpholinyl)phenyl]-1-butanone (IRGACURE® 369), and 2-methyl-1-[4-(methylthio)phenyl]-2-(4-morpholinyl)-1-propanone (IRGACURE® 907), both available from Ciba Specialty Chemicals (Tarrytown, N.Y.).

Antioxidant Compound

The curable compositions also include an antioxidant compound. In one embodiment, the antioxidant compound is a hindered phenolic compound. The combination of acylphosphine compounds and hindered phenol has been found to be particularly beneficial in providing a cured article with good properties. The hindered phenol can be chosen as desired for a particular purpose or intended application. Examples of suitable hindered phenols include, but are not limited to, monophenols such as 2,6-di-t-butyl-p-cresol, 2-t-butyl-4-methoxyphenol, 3-t-butyl-4-methoxyphenol, and 2,6-t-butyl-4-ethylphenol, bisphenols such as 2,2'-methylene-bis(4-methyl-6-t-butylphenol), 4,4'-thiobis (3-methyl-6-t-butylphenol), and 4,4'-butylidene-bis(3-methyl-6-t-butylphenol); and polymeric phenols such as 1,1,3-tris(2-methyl-4-hydroxy-5-t-butylphenyl)butane, 1,3, 5-trimethyl-2,4,6-tris(3,5-di-t-butyl-4-hydroxybenzyl)benzene, tetrakis[methylene-3-(3',5'-di-t-butyl-4'-hydroxyphenyl)propionate]methane, bis[3,3'-bis(4'-hydroxy-3-t-butylphenyl)butyric acid glycol ester, and tocopherol (vitamin E).

IRGANOX 1330 is a sterically hindered phenolic antioxidant ("3,3',3',5,5',5'-hexa-tert-butyl-a,a',a'-(mesitylene-2, 4,6-triyl)tri-p-cresol") commercially available from BASF.

Irganox 1010 is a sterically hindered phenolic antioxidant ("Pentaerythritol Tetrakis(3-(3,5-di-tert-butyl-4-hydroxyphenyl)propionate)") commercially available from BASF, or 1,3,5-trimethyl-2,4,6-tris(3,5-di-tert-butyl-4-hydroxybenzyl)benzene commercially available as ETHANOX™ 330 (Albemarle Corporation), pentaerythritol tetrakis[3-(3,5-di-tert-butyl-4-hydroxyphenyl)propionate] (Irganox 1010), tris(3,5-di-tert-butyl-4-hydroxybenzyl) isocyanurate (Irganox 3114), tris(3,5-di-tert-butyl-4-hydroxybenzyl) isocyanurate as Irganox 3114.

In the curable composition the mercapto-functional siloxane and the siloxane comprising the unsaturated compound are provided such that there is an excess of mercapto or thiol groups relative to the unsaturated groups. In one embodiment, the mercapto group to unsaturated group molar equivalent ratio is greater than 1:1. In one embodiment, the mercapto to unsaturated group molar equivalent ratio is from about 1.1:1 to about 6:1; from about 1.5:1 to about 6:1; from about 2.5:1 to about 6:1; from about 3:1 to about 5.5:1; from about 3.5:1 to about 5:1; even from about 4:1 to about 4.5:1. Here as elsewhere in the specification and claims, numerical values can be combined to form new and non-disclosed ranges.

The photoinitiator is present in the curable composition in an amount of from about 200 ppm to about 1500 ppm; from about 500 ppm to about 1200 ppm; even from about 750 ppm to about 1000 ppm. Here as elsewhere in the specification and claims, numerical values can be combined to form new and non-disclosed ranges. The loading of the photoinitiator should be controlled, as high loadings may increase yellowing of the cured material.

The hindered phenol is present in the curable composition in an amount of about 200 ppm or greater. In one embodiment, the hindered phenol is present in an amount of from about 200 ppm to about 2000 ppm; from about 400 ppm to about 1700 ppm; from about 600 ppm to about 1500 ppm; even from about 800 ppm to about 1200 ppm. Here as elsewhere in the specification and claims, numerical values can be combined to form new and non-disclosed ranges.

The curable composition can be utilized to form a cured article. The curable compositions can be cured by exposing the composition to UV or visible light. In one embodiment, the wavelength of the light can be from about 200 nm to about 420 nm.

Additionally, curing can be accomplished by other methods such as thermal curing and/or condensation curing. The present compositions provide a material that is curable by such methods. For condensation curing, it will be appreciated that the respective siloxanes should be provided with one or more suitable groups that will react with one another upon exposure to moisture. Thermal curing can be accomplished by introducing a thermal initiator to the composition and exposing the curable composition to a temperature of from about 70° C. to about 150° C. These alternative curing methods can be employed with the photocuring operation discussed above. In particular, it may be desirable to employ a dual curing operation for the production of thicker materials. Photocuring may result in a gradient cure profile in which the degree of curing decreases as the distance from an upper surface of the material increases. This can result because less light is able to reach the interior of the material. Therefore, thermal curing and/or condensation curing can allow for more complete curing through the bulk of the article.

The cured articles exhibit excellent properties making them suitable for a variety of applications. In one embodiment, the cured article has a refractive index of from about 1.41 to about 1.53; from about 1.42 to about 1.52; even from about 1.43 to about 1.51. In one embodiment, the cured article has a refractive index of about 1.45-1.49. The cured article can have excellent transparency, low gas permeability, desired hardness, etc. In one embodiment, the cured article has a transparency of about 85% or greater; about 90% or greater; about 95% or greater, about 97.5% or greater, or even about 99% or greater. In one embodiment, the cured article can have a hardness of about A10 to about D30; from about A20 to about D20; even from about A50 to about D10. Here as elsewhere in the specification and claims, numerical values can be combined to form new and non-disclosed ranges.

The cured articles formed from the compositions may also exhibit low yellowing over time. In embodiments, a cured article formed from the composition has a yellowing index of from about 0 to about 10 after ageing for 350 hours. Yellowness index may be measured by any suitable method known to those in the arts. In embodiments, yellowness index may be tested in accordance with ASTM E313. The testing employs any suitable spectrophotometer (e.g., a Macbeth Color-Eye 7000).

The modified silicone material can be used to make a variety of materials for a variety of applications. The modified silicone material in accordance with aspects of the invention can be used to form coatings or films that can be applied to the surface of other materials or that can be used to form products of a desired shape. The modified silicone material and polymers formed therefrom can exhibit relatively high refractive indexes and excellent mechanical properties and also avoid other problems associated with polymers comprising phenyl groups as the high refractive index component. The present polymers can be used in a variety of applications including, but not limited to, contact lenses, intraocular lenses solid state lighting encapsulants (light emitting diodes, organic light emitting diodes, laser diodes), waveguides (both planar and "fiber" geometries), optical computing, optical storage media, antireflection coatings, conformal coatings, optical lenses, microlenses, automobile topcoats, paint formulations and topcoats, personal care products, e.g., color cosmetics and hair care products, gradient refractive index optical components, dynamic gradient refractive index components, etc.

The modified silicone material and polymers formed therefrom can be used in a composition or formulation suitable for producing a composition or material useful for the desired application. Such compositions or formulations may include a suitable carrier, filler, additive, etc. or other materials to provide a suitable material.

Aspects of the technology are further understood with reference to the following examples. The examples are intended to illustrate aspects and embodiments of the technology and are not intended to limit the technology to such examples.

EXAMPLES

Examples 1-4

Compositions were prepared according to the formulations listed in Table 1:

TABLE 1

| Formulation components | Ex 1 | Ex 2 | Ex 3 | Ex 4 |
|---|---|---|---|---|
| SMS 992* (thiol siloxane) | 1.0 g | 1.0 g | 1.0 g | 1.0 g |

TABLE 1-continued

| Formulation components | Ex 1 | Ex 2 | Ex 3 | Ex 4 |
|---|---|---|---|---|
| $D_4^{vi}$ | 0.11 g | 0.11 g | 0.11 g | 0.11 g |
| Genocure MBF | 1000 ppm | | | |
| Lucirin TPO | | 1000 ppm | | |
| Lucirin TPO-L | | | 1000 ppm | |
| Irgacure 184 | | | | 1000 ppm |

*(Mercaptopropyl)methylsiloxane homopolymer from Gelest, Inc.

FIG. 1 shows the yellowing index over time of cured articles formed from the compositions.

Examples 5-7

Cured articles are formed from the compositions shown in Table 2:

TABLE 2

| Formulation components | Ex. 5 | Ex. 6 | Ex. 7 |
|---|---|---|---|
| Irganox 3114 | 500 ppm | | |
| Irganox 1081 | | 500 ppm | |
| Irganox 1330 | | | 500 ppm |
| SMS 992 (thiol siloxane) | 1 g | 1 g | 1 g |
| $D_4^{vi}$ | 0.11 g | 0.11 g | 0.11 g |
| Luciron TPO | 0.4 wt % | 0.4 wt % | 0.4 wt % |

Figure 2:
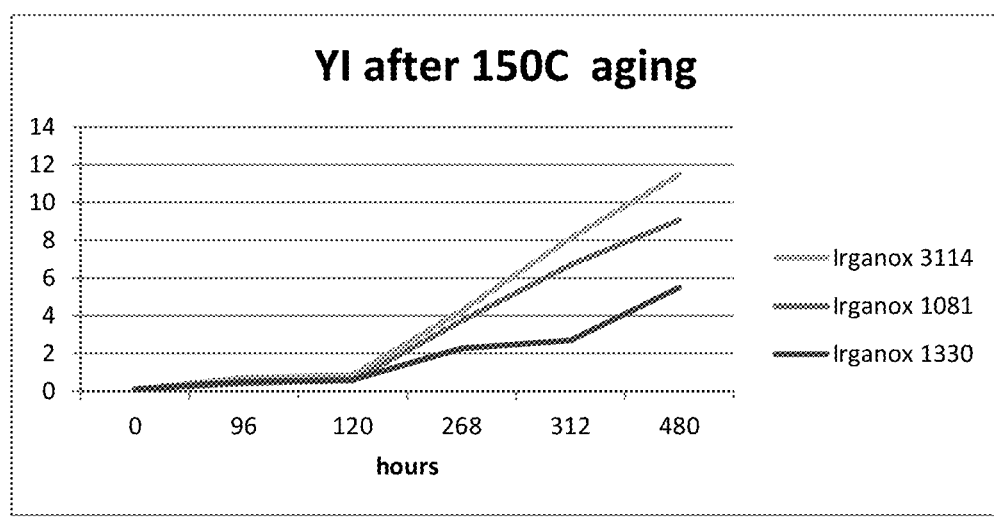
FIG. 2 is a graph showing the yellowing index of cured articles in accordance with embodiments of the present technology.

FIG. 2 shows the yellowing index over time of cured articles formed from the compositions of Examples 5-7.

Examples 8-14

Cured articles are formed from the compositions set forth in Table 3 by typical UV curing conditions well known to people skilled in this art. The formulation is prepared by mixing all the components in a glass vial and then deaerated by applying vacuum. The formulation is then poured into an open mold and exposed to UV lamp of known intensity (75 mW/cm2) for 60-90 seconds.

TABLE 3

| | Monomer 1 | Monomer 2 | Ratio of monomer 1:monomer 2 (—SH:Vinyl) | wt % Photoinitiator (Lucrin TPO) | Initial color | Refractive index | Color after aging at 150 C. (hot air oven) |
|---|---|---|---|---|---|---|---|
| Ex. 8 | SMS 992 | $D_4^{vi}$ | 0.33 | 0.35 | colorless | 1.4999 | yellow after 2 days |
| Ex. 9 | SMS 992 | $D_4^{vi}$ | 1 | 0.3 | colorless | 1.4999 | yellow after 7 days |
| Ex. 10 | SMS 992 | $D_4^{vi}$ | 2.8 | 0.5 | colorless | 1.4999 | yellow after 12 days |
| Ex. 11 | SMS 992 | $D_4^{vi}$ | 5.6 | 0.4 | colorless | 1.4999 | yellow after 15 days |
| Ex. 12 | B 7610 | $D_4^{vi}$ | 2.1 | 0.4 | colorless | 1.42 | pale yellow |
| Ex. 13 | B 7610 | $D_4^{vi}$ | 3 | 0.4 | colorless | 1.42 | very pale yellow |
| Ex. 14 | B 7610 | $D_4^{vi}$ | 0.3 | 0.3 | colorless | 1.42 | bright yellow |

As illustrated in Table 3, the stability of the article to yellowing increases with larger mercapto group to vinyl group molar ratios.

Examples 15-18

The effect of the hindered phenol concentration is evaluated by varying the concentration of the hindered phenol between 0 and 2500 ppm. Compositions were prepared according to the formulations in Table 4.

TABLE 4

| Chemicals | Ex 15 | Ex 16 | Ex 17 | Ex 18 |
|---|---|---|---|---|
| SMS 992 | 2.02 g | 2.02 g | 2.02 g | 2.02 g |
| $D_4^{vi}$ | 0.22 g | 0.22 g | 0.22 g | 0.22 g |
| Lucirin TPO-L (mg) | 5 | 5 | 5 | 5 |
| Irganox1081 (ppm) | 0 | 660 | 1860 | 2400 |

Figure 3:
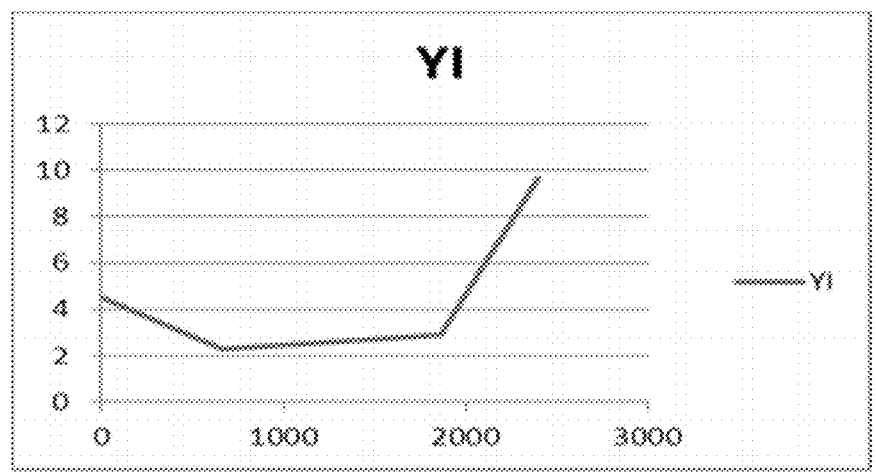
FIG. 3 is a graph showing the yellowing index of cured articles in accordance with embodiments of the present technology where different concentrations of hindered phenol.

FIG. 3 shows the effect that the hindered phenol concentration has on yellowing in the cured article.

While the above description contains many specifics, these specifics should not be construed as limitations on the scope of the invention, but merely as exemplifications of preferred embodiments thereof. Those skilled in the art will envision many other possible variations that are within the scope and spirit of the invention as defined by the claims appended hereto.

What is claimed is:

1. A curable composition comprising:
   (a) a mercapto-functional siloxane;
   (b) a siloxane comprising an unsaturated hydrocarbon group;
   (c) a photoinitiator; and
   (d) an antioxidant compound comprising a hindered phenol; wherein (a) and (b) are provided such that the composition has a molar equivalent ratio of mercapto groups to unsaturated groups of about 2.5:1 to about 6:1.

2. The curable composition of claim 1, wherein the mercapto-functional siloxane is a siloxane of the formula:

$$M^1_a M^2_b D^1_c D^2_d T^1_e T^2_f Q_g \qquad (1)$$

where the M-units are of the formula $R^1R^2R^3SiO_{1/2}$; the D-units are of the formula: $R^4R^5SiO_{2/2}$; the T-units have three Si—O bonds are of the formula: $R^6SiO_{3/2}$; the Q-units are of the formula $SiO_{4/2}$; $R^1$-$R^6$ are independently chosen from hydrogen, a hydroxyl, a linear or branched alkyl group, an alcohol, a linear or branched alkoxy group, an aryl group, an alkylvinyl group, an amide, an amino-group, an acryloyl group, a carbonyl group, a silyloxy group, an isocyanyl group, a mercapto group, an epoxy-containing group, where one or more of $R^1$-$R^6$ is a mercapto group; a is from 0-1000; b is from 0-1000; c is from 0-500; d is from 0-500; e is from 0-100; f is from 0-100; and g is from 0 to 200, where at least two subscripts on any particular embodiment are positive integers.

3. The curable composition of claim 2, wherein the mercapto group is of the formula —$(CH_2)_h SH$, where h is 0-10.

4. The curable composition of claim 3, wherein the mercapto group is chosen from mercaptomethyl, 2-mercaptoethyl, 3-mercaptopropyl, 4-mercaptobutyl, or a combination of two or more thereof.

5. The curable composition of claim 1, wherein the siloxane (b) is of the formula:

where the M-units are of the formula $R^7R^8R^9SiO_{1/2}$; the D-units are of the formula $R^{10}R^{11}SiO_{2/2}$; the T-units have three Si—O bonds are of the formula $R^{12}SiO_{3/2}$; the Q-units are of the formula $SiO_{4/2}$; $R^7$-$R^{12}$ are independently chosen from hydrogen, a hydroxyl, a linear or branched alkyl group, an alcohol, a linear or branched alkoxy group, an aryl group, an alkylvinyl group, an amide, an amino group, an acryloyl group, a carbonyl groups, a silyloxy group, an isocyanyl group, a mercapto group, an epoxy-containing group, where one or more of $R^7$-$R^{12}$ comprises an unsaturated group; i is from 0-1000, j is from 0-1000, k is from 0-500, l is from 0-100, m is from 0-100, n is from 0-100, and o is from 0 to 200, where at least two subscripts on any particular embodiment are positive integers.

6. The curable composition of claim 5, wherein the unsaturated group comprises an alkenyl group of the formula $CH_2=CH-R^{13}{}_x-$ where $R^{13}$ is a C1-C20 alkyl, a C1-C20 branched alkyl, a C1-C10 cyclic alkyl, or a C6-C10 aryl group.

7. The curable composition of claim 5, wherein the unsaturated group is chosen from vinyl, allyl, styryl, butenyl, pentenyl, hexenyl, or a combination of two or more thereof.

8. The curable composition of claim 1, wherein the photoinitiator is an acylphosphine compound.

9. The curable composition of claim 8, wherein the acylphosphine compound is chosen from a mono-acylphosphine compound, a bis-acylphosphine compound, or a combination of two or more thereof.

10. The curable composition of claim 8, wherein the acylphosphine compound is chosen from diphenyl(2,4,6-trimethylbenzoyl)phosphine oxide and bis(2,6-di-methoxybenzoyl)-2,4,4-trimethylpentylphosphine oxide.

11. The curable composition of claim 1, wherein the hindered phenol is chosen from 2,6-di-t-butyl-p-cresol; 2-t-butyl-4-methoxyphenol; 3-t-butyl-4-methoxyphenol; 2,6-t-butyl-4-ethylphenol; 2,2'-methylene-bis(4-methyl-6-t-butylphenol); 4,4'-thiobis(3-methyl-6-t-butylphenol); 4,4'-butylidene-bis(3-methyl-6-t-butylphenol); 1,1,3-tris(2-methyl-4-hydroxy-5-t-butylphenyl)butane; 1,3,5-trimethyl-2,4,6-tris(3,5-di-t-butyl-4-hydroxybenzyl)benzene; tetrakis[methylene-3-(3',5'-di-t-butyl-4'-hydroxyphenyl) propionate]methane; bis[3,3'-bis(4'-hydroxy-3-t-butylphenyl)butyric acid glycol ester; tocopherol; or a combination of two or more thereof.

12. The curable composition of claim 1 comprising the photoinitiator in an amount of from about 200 ppm to about 1500 ppm.

13. The curable composition of claim 1 comprising the hindered phenol in an amount of from about 200 ppm to about 2000 ppm.

14. A cured article formed from a curable composition comprising:
(a) a mercapto-functional siloxane comprising;
(b) a siloxane comprising an unsaturated hydrocarbon group;
(c) a photoinitiator; and
(d) an antioxidant compound comprising a hindered phenol; wherein (a) and (b) are provided such that the composition has a molar equivalent ratio of mercapto groups to unsaturated groups of about 2.5:1 to about 6:1.

15. The cured article of claim 14, wherein the cured article has a refractive index of from about 1.41 to about 1.53.

16. The cured article of claim 15, wherein the cured article has a yellowing index of from about 0 to about 10 after ageing for 350 hours.

17. The cured article of claim 15, wherein the article has a transparency of about 85% or greater.

18. A method of forming a cured article comprising exposing a curable composition to UV light, visible light, or a combination of two or more thereof, the composition comprising: (a) a mercapto-functional siloxane; (b) a siloxane comprising an unsaturated hydrocarbon group; (c) a photoinitiator; and (d) an antioxidant compound comprising a hindered phenol, wherein (a) and (b) are provided such that the composition has a molar equivalent ratio of mercapto groups to unsaturated groups of about 2.5:1 to about 6:1.

19. The method of claim 18 further comprising heating the curable composition by exposing the composition to a temperature of from about 70° C. to about 150° C.

* * * * *